United States Patent [19]
Goto

[11] Patent Number: 5,598,749
[45] Date of Patent: Feb. 4, 1997

[54] TABLE TURNING APPARATUS

[75] Inventor: Takeshi Goto, Numazu, Japan

[73] Assignee: Toshiba Kikai Kabushiki Kaisha, Japan

[21] Appl. No.: 348,091

[22] Filed: Nov. 25, 1994

[30]     Foreign Application Priority Data

Nov. 26, 1993 [JP] Japan ................... 5-296858

[51] Int. Cl.$^6$ .................................. B23Q 1/06
[52] U.S. Cl. .................. 74/820; 74/409; 74/813 R; 74/813 C; 74/427; 403/277
[58] Field of Search ............... 74/409, 813 R, 74/813 C, 820, 815, 427; 403/277, 372, 278, 281, 203, 365

[56]          References Cited

U.S. PATENT DOCUMENTS

| 1,618,927 | 2/1927 | Hatcher ....................... 74/427 |
| 3,048,059 | 8/1962 | Cross ......................... 74/813 |
| 4,015,487 | 4/1977 | Pfister ....................... 74/813 L |
| 4,261,218 | 4/1981 | Eagan, Sr. .................... 74/409 |
| 4,354,769 | 10/1982 | Peter ......................... 403/277 |
| 4,589,299 | 5/1986 | Kobayashi et al. .............. 74/427 |
| 4,615,230 | 10/1986 | Guichard ...................... 74/427 |
| 4,754,660 | 7/1988 | Kobayashi et al. .............. 74/427 |
| 5,090,267 | 2/1992 | Gramling ...................... 74/813 L |
| 5,392,666 | 2/1995 | Lin ........................... 74/427 |
| 5,426,992 | 6/1995 | Morii et al. .................. 74/409 |

*Primary Examiner*—Charles A. Marmor
*Assistant Examiner*—David M. Fenstermacher
*Attorney, Agent, or Firm*—Cushman Darby & Cushman Intellectual Property Group of Pillsbury Madison & Sutro, LLP

[57]            ABSTRACT

A table-turning driving apparatus comprises a pair of first and second worm shafts 16 and 17 which engage a driving shaft through gears and which is rotated in the same direction of rotation as that of the driving shaft. One 16 of the worm shafts is fixed, at the end thereof directed to the driving shaft, to a gear 28 by means of a fastening and connecting member 29, 30 so that the phase thereof is adjustable relative to the gear 28, and pinions 34, 40 integral with worm wheels 33, 39 which engage worms 32, 38 of the above-mentioned worm shafts 16, 17 are connected to a ring gear 65 of the table.

4 Claims, 5 Drawing Sheets

TABLE TURNING APPARATUS

FIELD OF THE INVENTION

This invention relates to a table-turning driving apparatus in a machine tool and, more particularly, a table-turning driving apparatus which allows a simple adjustment in an amount of backlash and an amount of preload in a driving system comprising a gear mechanism for transmitting power to the table.

BACKGROUND OF THE INVENTION

FIG. 4 shows such a table-turning driving apparatus. This table-turning driving apparatus is so constituted that a plurality of helical gears of various sizes are provided on shafts 1, 2, 3 and 4 coaxially therewith, respectively, and such gear train transmits the power of a drive motor 7 to the table. Helical gears 9a, 9b and pinions 10a, 10b are mounted on shafts 5 and 6 coaxially therewith, and the pinions 10a, 10b are adapted to engage a ring gear 11 integral with the table not shown.

Such the table-turning driving apparatus requires an adjustment in an amount of backlash and an amount of preload of the gear train in a driving system for smooth operation.

FIG. 5 shows a mechanism for adjusting an amount of backlash in the table-turning driving apparatus shown in FIG. 4. A spline shaft is used as the shaft 2, and two helical gears 12a, 12b having the same dimensions are mounted on the spline shaft 2 coaxially therewith so as to engage spline grooves 13. An adjusting collar 14 is interposed between the gears 12a and 12b to adjust the distance in the axial direction, so that a change in the dimension of thickness of the adjusting collar 14 allows an adjustment in the backlash between the helical gears engaging each other, resulting in an adjustment in the amount of backlash between the pinion 10 on the final shaft and the ring gear 11.

However, such an adjustment in backlash results in an intricate operation comprising many steps of measuring the distance between the helical gears 12a and 12b in a state of temporary assembly, machining the thickness of the adjusting collar 14 according to the result of the measurement and, thereafter, incorporating the adjusting collar 14 into the device to perform a true assembly. This requires a high degree of skill to adjust the amount of backlash to a proper value.

Further, the conventional device has a disadvantage in that the backlash is adjustable only in the direction of reducing the thickness of the adjusting collar 14, and is not adjustable in the reverse direction.

Moreover, since the conventional device has a number of shafts of the gear train and a number of helical gears, it becomes a complicated mechanism having many parts and, therefore, problems in the working properties of assembly and disassembly, maintenance and the like are pointed out.

SUMMARY OF THE INVENTION

Accordingly, it is an object of the invention to provide a table-turning driving apparatus which eliminates the above-described problems contained in the prior art as described above and which facilitates an operation of adjusting the amount of backlash and which is simple in construction and moderate in price so as to facilitate the working properties of assembly, disassembly and maintenance.

In order to achieve the above-mentioned object of the invention, according to the invention, there is provided a table-turning driving apparatus in a machine tool for transmitting power from a driving source to the table, which comprises: a driving shaft of the driving source; a table of the machine tool which performs positioning in continuous rotation; a pair of first and second worm shafts, each having a worm, which are rotated in the same direction of rotation as that of the driving shaft; gear means for transmitting the power from the driving shaft to the pair of first and second worm shafts; a fastening and connecting means for fixing one of the worm shafts, at the end thereof directed to the driving shaft, to the gear means, so that the phase thereof is adjustable relative to the gear means; worm wheel means each engaging the worm; pinion means each being integral with the worm wheel; and a ring gear means connected to the pinion means.

In the table-turning driving apparatus as described above, the first and second worm shafts can be arranged with the driving shaft interposed therebetween and parallel to the driving shaft.

In the table-turning driving apparatus as described above, the worm shafts consist of an outer first worm shaft and a second worm shaft fitted coaxially inside the first worm shaft, the second worm shaft being fixed to the first worm shaft through the fastening and connecting means and, simultaneously, the worms of the first and second worm shafts having the screws in reverse relation to each other.

Since the first and second worm shafts come to be capable of being turned in opposite directions of rotation to each other by loosening the fastening and connecting member, proper clearances can be provided between the tooth face of the ring gear of the table and the tooth faces of the pinions on the final shafts, and if the fastening and connecting member is fastened to fix the worm shaft with such proper clearances remaining between the tooth faces, then an amount of backlash in the driving system can be simply adjusted and a re-adjustment can be performed in a similar way. Further, since the loads applied to the tooth faces of the ring gear by the pinions can be adjusted, the amount of preload in the driving system can be adjusted. Such adjustment in the amount of backlash and the amount of preload is possible in both the directions of increasing and decreasing the amount of backlash and the amount of preload, because the first and second worm shafts can be turned in both the normal and reverse directions of rotation.

BRIEF DESCRIPTION OF THE DRAWINGS

Other objects and aspects of the invention will be apparent from the following description with reference to the accompanying drawings in which.

DETAILED DESCRIPTION OF THE EMBODIMENT

An embodiment of a table-turning driving apparatus according to the invention will be described with reference to the accompanying drawings.

Figure 1:
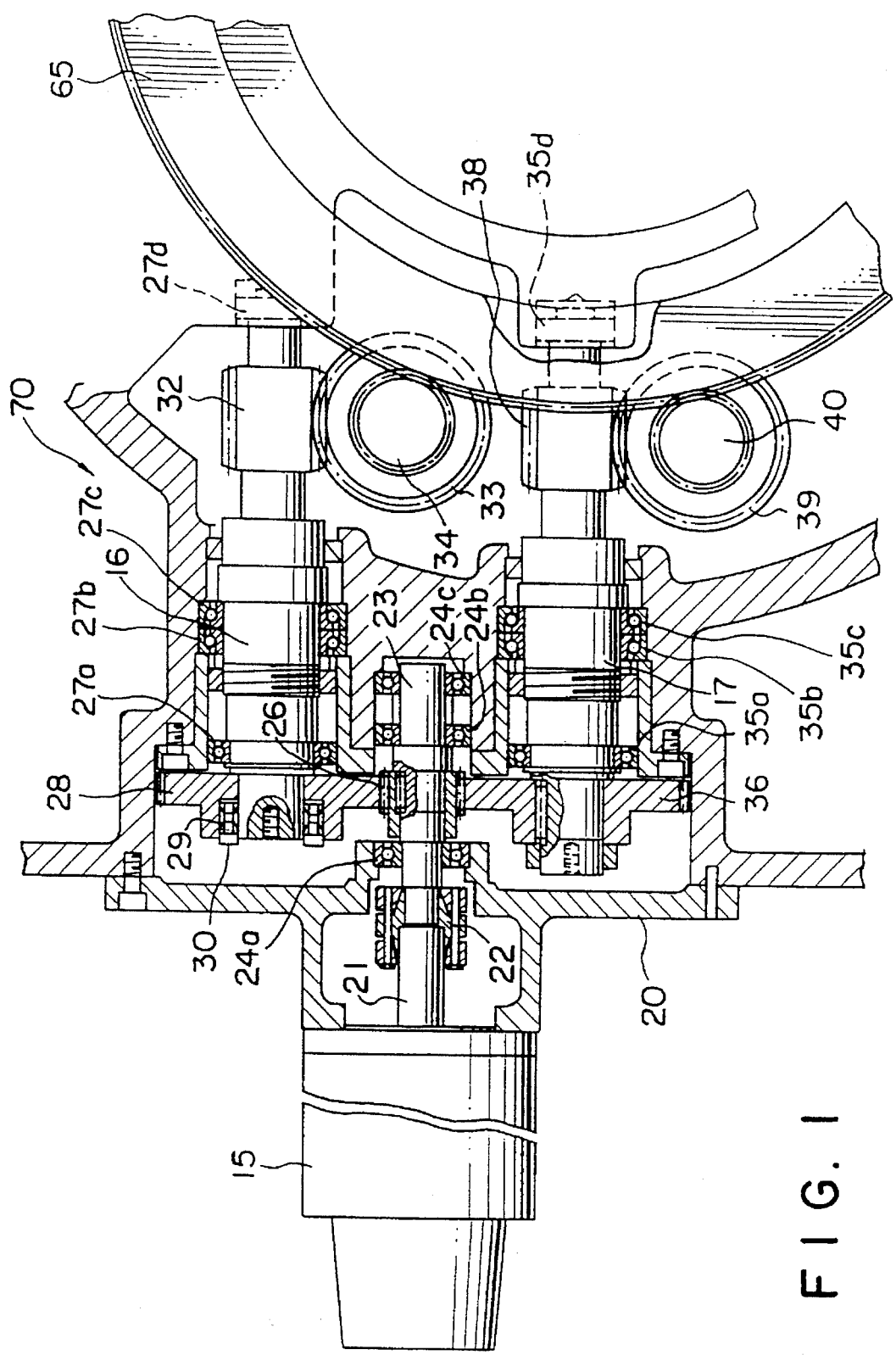
FIG. 1 is a plan view, partly in section, of an embodiment of a table-turning driving apparatus according to the invention.
Figure 2:
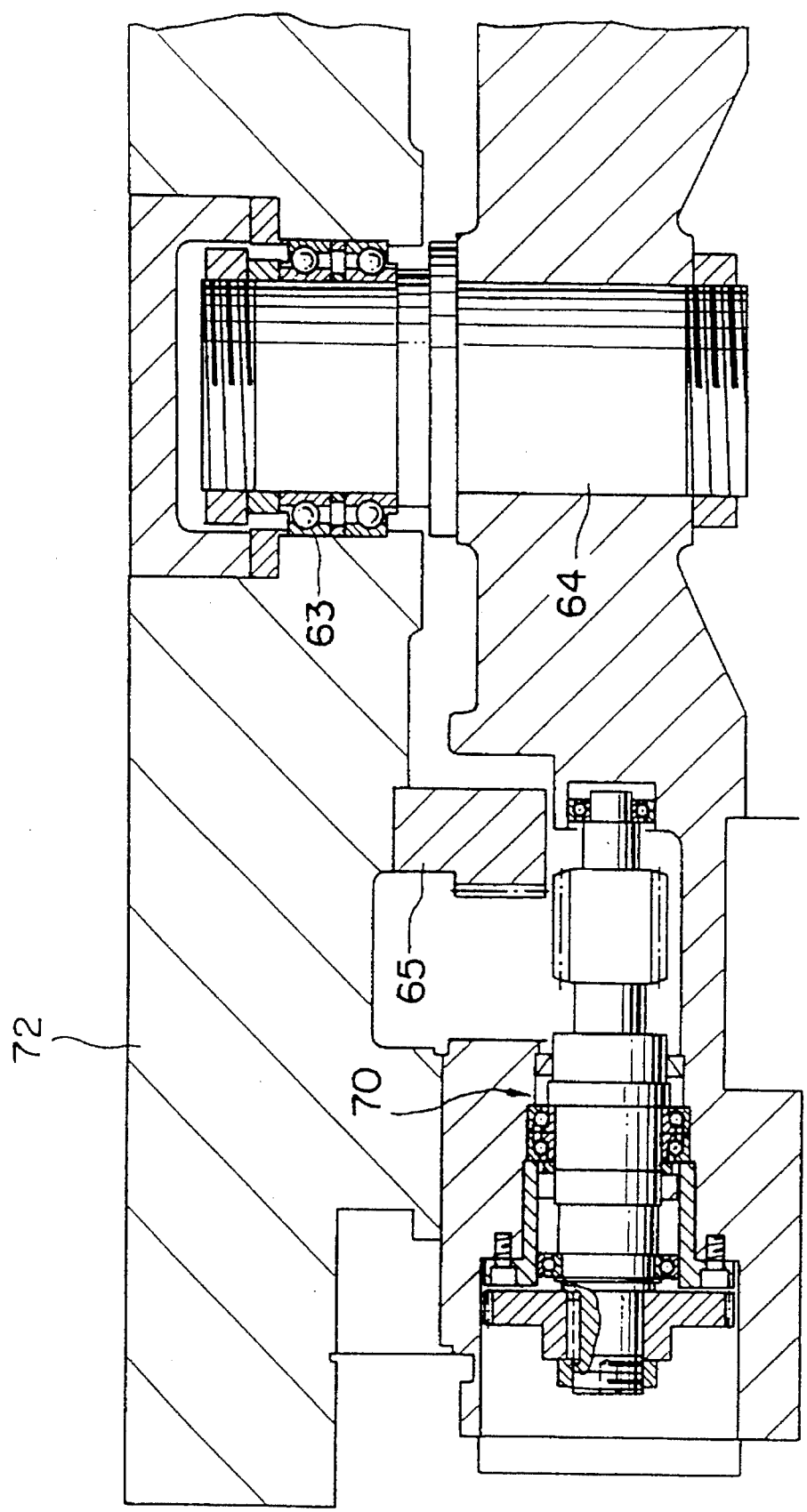
FIG. 2 is a sectional view showing a table of a tool machine to which the table-turning driving apparatus according to the embodiment is applied.

Referring to FIG. 2, reference character 72 shows a table of a tool machine to which the embodiment is applied. The table 72 is rotatably supported by a center shaft 64 through bearings 63 in a horizontal position. On the lower surface of the table 72 is mounted a ring gear 65 to which a table-turning driving apparatus 70 is connected according to the embodiment. Hereupon, the detailed construction of the table-turning driving apparatus 70 is shown in FIG. 1 in a plan view.

The table-turning driving apparatus 70 is constituted so that the power of a driving motor 15 is transmitted from a pair of worm shafts 16 and 17 through worm wheels 32 and 38 and, further, from pinions 34 and 40 to the ring gear 65. In this case, the reduction ratios due to the respective pinions 34 and 40 are determined so as to be the same.

The driving motor 15 is secured to a motor bracket 20, and a rotary shaft 21 of the driving motor 15 is connected to a rotary shaft 23 through a coupling 22. In this case, the rotary shaft 23 is rotatably supported by bearings 24a, 24b and 24c. On the rotary shaft 23 is mounted a gear 26 which connects the driving shaft to the above-mentioned first worm shaft 16 and second worm shaft 17.

In this embodiment, the first worm shaft 16 and second worm shaft 17 are arranged parallel to the driving shaft 21 of the motor 15. The first worm shaft 16 is rotatably supported by bearings 27a, 27b, 27c, and 27d and a greater gear 28 which engages the above-mentioned gear 26 is secured to the end of the first worm shaft 16 directed to the motor.

Further, the first worm shaft 16 is constituted at the end thereof directed to the motor so that the phase thereof relative to the gear 28 can be adjustably fixed using a fastening and connecting member consisting of flexion couplings 29 and bolts 30. Namely, fastening the bolts 30 causes the flexion couplings 29 to be expanded in diameter to thereby integrally fix the first worm shaft 16 and the gear 28 and, to the contrary, loosening the bolts 30 to slacken the flexion couplings 29 allows the rotation of the first worm shaft 16 relative to the gear 28.

The first worm shaft 16 is provided, at the end thereof directed to the ring gear 65, with the worm 32 which engages a worm wheel 33. This worm wheel 33 is integrally formed with the pinion 34, which is adapted to engage the ring gear 65 of the table.

Similarly, the second worm shaft 17 is rotatably supported by bearings 35a, 35b, 35c, and 35d and on one end of the second worm shaft 17 is firmly mounted a gear 36 which engages the above-mentioned gear 26, and on the other end thereof is provided the worm 38 which is connected to a worm wheel 39. This worm wheel 39 is adapted to engage the ring gear 65 through the integral pinion 40.

The present embodiment is constituted as described above, and the operation thereof will be explained.

First, an adjusting operation for canceling the backlash in a driving system for transmitting the power of the motor 15 to the ring gear 65 of the table through the worm shafts 16 and 17 will be explained.

With the situation in FIG. 1 where the flexion couplings 29 are loosened, the first worm shaft 16 and the second worm shaft 17 can be turned in the reverse direction relative to each other. Therefore, in the driving system of the worm shaft 16, the first worm shaft 16 is turned until the tooth face of the pinion 34 on the final shaft comes into contact with the tooth face of the ring gear 65 and, thereafter, the second worm shaft 17 is turned in the reverse direction, thereby causing the pinion 40 on the final shaft to be brought into contact with the tooth face of the ring gear 65. Then, with the tooth faces of the pinions 34 and 40 remaining in contact with the tooth faces of the ring gear 65, the bolts 30 are fastened, causing the flexion couplings 29 to fix the first worm shaft 16 and the gear 28, so that the backlash in the driving system is canceled.

Moreover, loads applied to the tooth faces of the ring gear 65 by the pinions 34, 40 can be adjusted by properly regulating the magnitude of torque as the first and second worm shafts 16 and 17 are turned. Accordingly, it is possible not only to cancel the backlash but also to set an amount of preload in the driving system in advance.

Adjustment for providing the proper backlash to the driving system is performed by adjusting the clearances between the tooth faces of the pinions 34, 40 on the final shafts and the tooth faces of the ring gear 65. When the clearances have been adjusted to proper values, the flexion couplings 29 are fastened to thereby allow the amount of backlash in the driving system to be adjusted to a proper value. In this case, since both the first and second worm shafts 16 and 17 can be turned in both the directions of increasing and decreasing the clearance between the tooth faces, adjustment in backlash can be made in both the positive and negative directions.

After setting of the amount of backlash and the amount of preload, as described above, re-adjustment is often necessary. Also in such a case, the flexion couplings 29 are loosened again and adjustment can be simply made in a similar manner. In addition, since the flexion couplings 29 can be loosened and fastened at the ends of the shafts directed to the motor, a better working property is provided.

Figure 3:
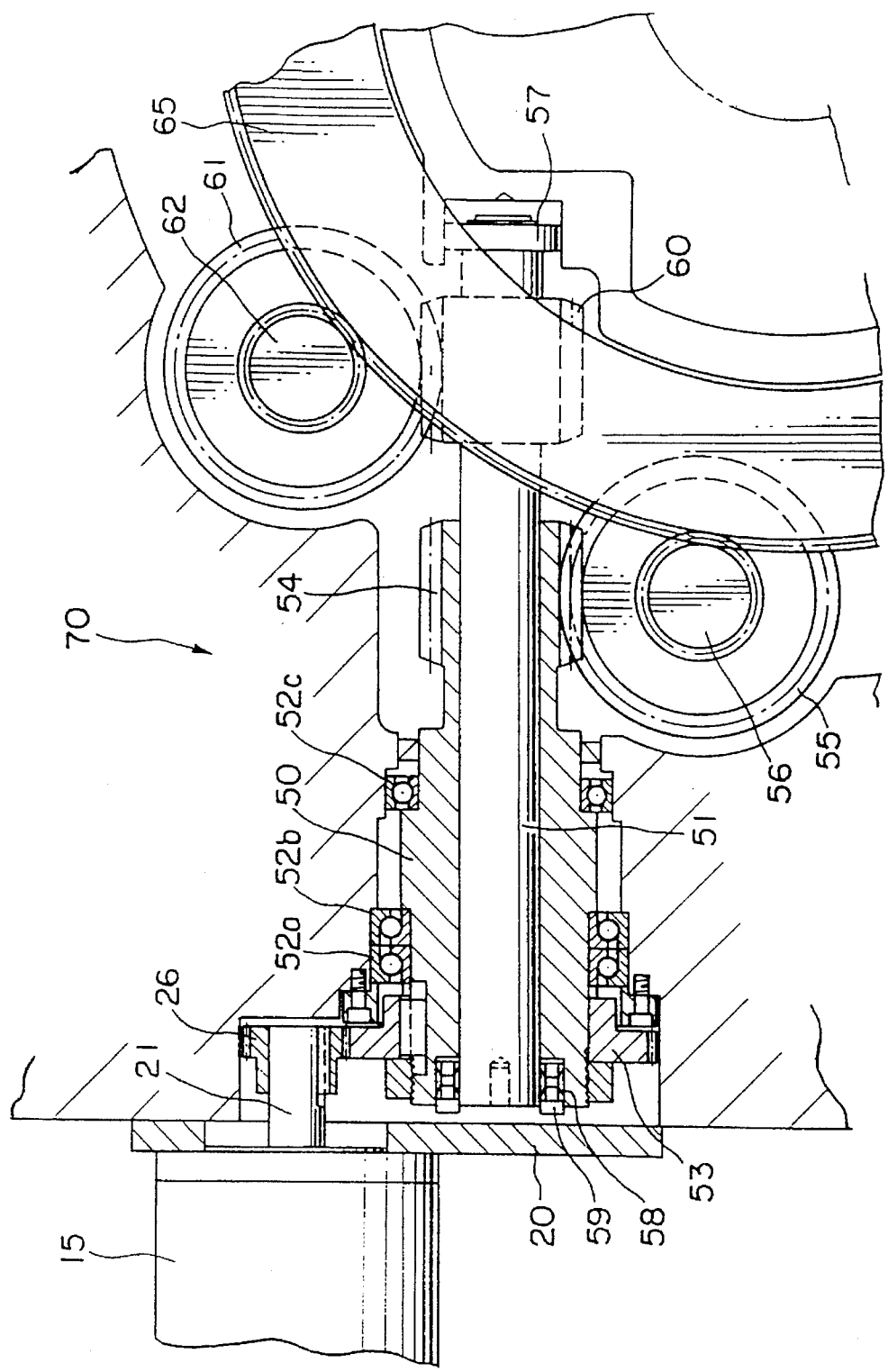
FIG. 3 is a plan view, partly in section, of a table-turning driving apparatus according to another embodiment.
Figure 4:
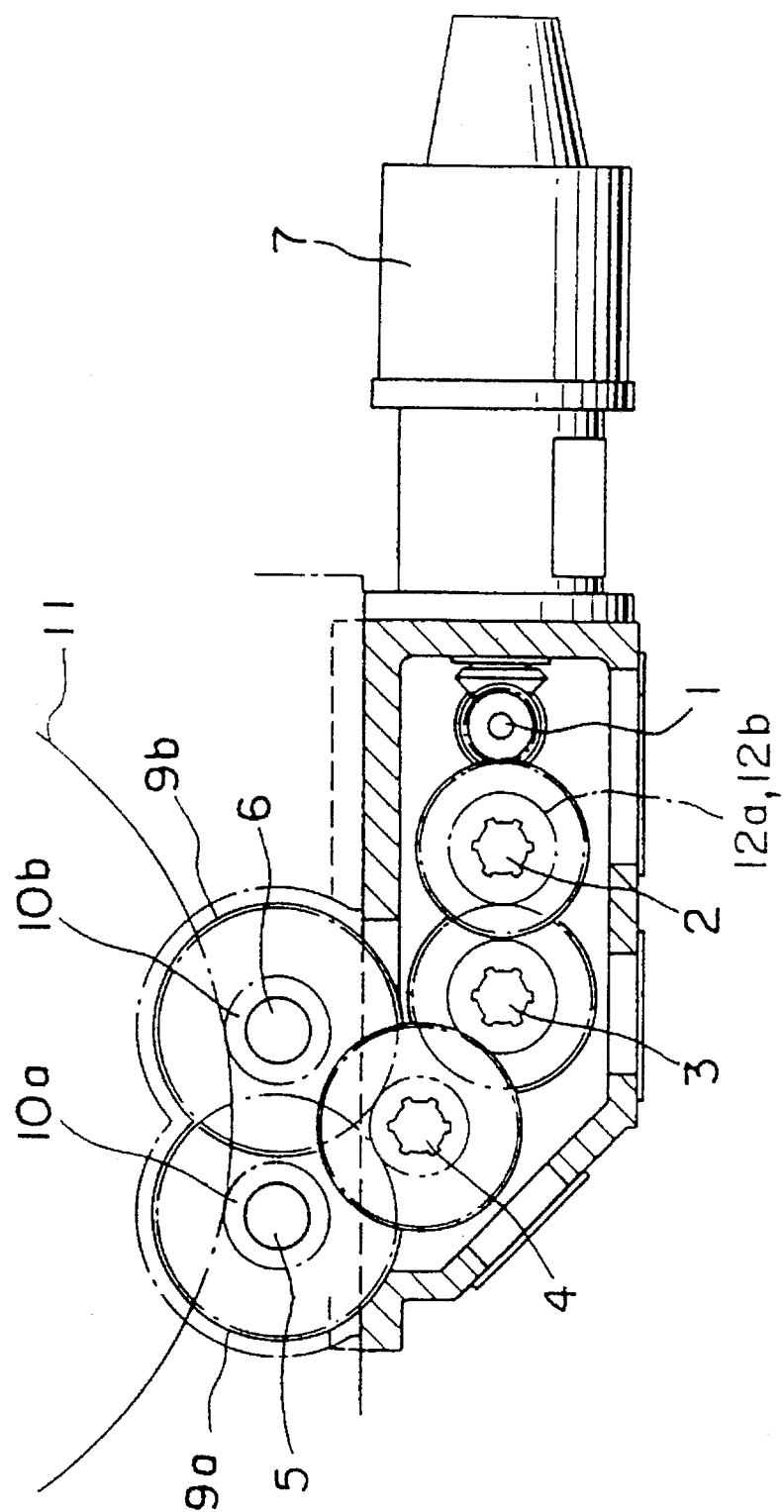
FIG. 4 is a plan view showing a table-turning driving apparatus in the prior art.
Figure 5:
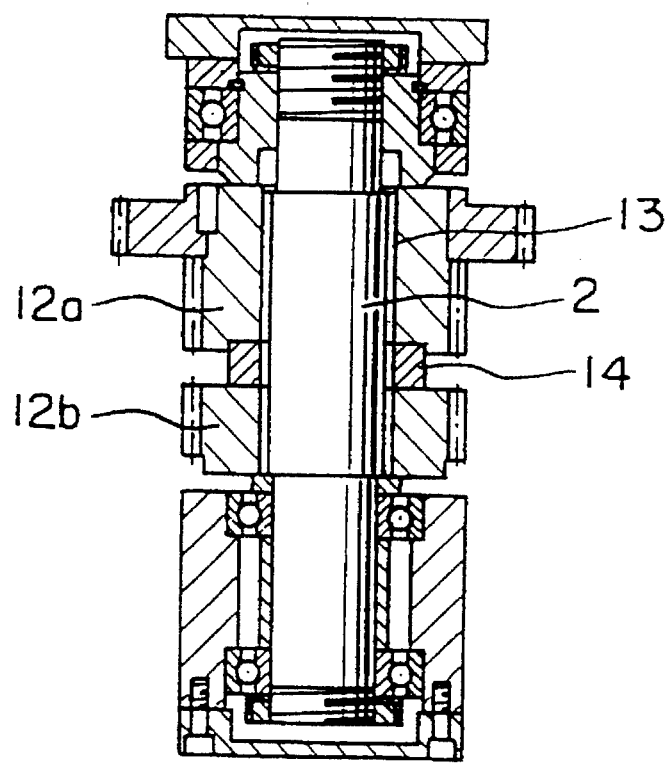
FIG. 5 is a sectional view showing a mechanism for adjusting the backlash in a driving system of the table-turning driving apparatus shown in FIG. 4.

Further, another embodiment of the present invention will be explained with reference to FIG. 3, in which the same reference characters designate the same components as those in the above-mentioned first embodiment.

In the above-mentioned first embodiment, the two worm shafts are provided in parallel relation, while in this embodiment, two worm shafts 50 and 51 are arranged in coaxial relation.

The outer first worm shaft 50 is rotatably supported by way of bearings 52a, 52b and 52c and, simultaneously, the second worm shaft 51 is integrally fitted inside the first worm shaft 50 in a coaxial manner, so that the first and second worm shafts 50 and 51 can be integrally rotated in the same direction. A gear 53 at the driven side, which engages with a gear 26 at the driving side mounted on the rotary shaft 21 of the motor 15, is secured to the end of the first worm shaft 50 directed to the motor, and a worm 54 of left hand screw is provided at the right end (as shown in FIG. 3) of the worm shaft 50. This worm shaft 50 is engaged by a worm wheel 55, and the ring gear 65 is engaged by a pinion 56 integral with the worm wheel 55.

The second worm shaft 51 is rotatably supported at one end thereof by way of a bearing 57, and is fixed at the other end relative to the first worm shaft 50 using a fastening and connecting member consisting of Spannrings 58 and bolts 59. Therefore, when the bolts 59 are loosened to slacken the flexion coupling 58, the second worm shaft 51 can be turned to thereby allow an adjustment in the phase thereof relative to the gear 26. On the second worm shaft 51 at the end directed to the table is firmly mounted a worm 60 of a right hand screw which is a screw in the reverse direction to that of the worm 54 of the first worm shaft 50. The worm 60 is engaged by a worm wheel 61, and the ring gear 65 is engaged by a pinion 62 integral with the worm wheel 61.

The construction of the embodiment as described above allows the first and second worm shafts 50 and 51 to be turned in the reverse direction to each other by loosening the bolts 59 to slacken the flexion couplings 58. Accordingly, adjustment in the clearances between the tooth faces of the pinions 56, 62 on the final shafts and the tooth faces of the ring gear 65 enables the backlash in the driving system to be adjusted to a proper value. Further, since loads, which are applied to the tooth faces of the ring gear 65, can be adjusted by turning the first and second worm shafts 50 and 51 in the reverse direction to each other with the pinions 56, 62 engaging the ring gear 65, an amount of preload in the engaged condition can be adjusted.

In addition, since moving the second worm shaft 51 in the axial direction with the flexion couplings 58 being slackened enables both a clearance between the tooth face of the pinion 62 and the tooth face of the ring gear 65 and a load applied to the tooth face to be adjusted by the worm 60, adjustment in both the amount of backlash and the amount of preload can be made similarly.

Further, since in the present embodiment the first worm shaft 50 and the second worm shaft 51 are constituted coaxially and, simultaneously, the worms 54 and 60 are made having screws in a reverse relation to each other, the worm wheels 55 and 61 can be disposed at positions where they confront each other, thereby making it possible to save a great deal of space compared with the first embodiment.

As is apparent from the explanation described above, a device according to the invention comprises a pair of first and second worm shafts which engage a driving shaft through gears and which are rotated in the same direction of rotation as that of the above-mentioned driving shaft, one of the above-mentioned worm shafts being fixed at the end thereof directed to the driving shaft by means of a fastening and connecting member so that the phase thereof can be adjusted relative to the above-mentioned gears, and pinions each being integral with a worm wheel engaging a worm of each of the worm shafts are connected to the ring gear of the table. With such a construction, an amount of backlash and an amount of preload in the driving system can be easily adjusted with a better working property and, further, its adjustment is possible in both the positive and negative directions, thereby allowing an adjusting operation to be widely facilitated compared with the prior art.

Moreover, since the constitution of the first and second worm shafts being coaxial allows a reduction in the number of parts and a simplification in construction, maintenance operations such as assembly, disassembly and the like are easily performed and, in addition, economization of space can be achieved.

What is claimed is:

1. A table turning apparatus in a machine tool for transmitting power from a driving source to a table, which comprises:

a driving shaft of said driving source having a pinion gear thereof;

said table of said machine tool which performs positioning in continuous rotation;

a pair of first and second worm shafts, each having a worm, which are rotated in the same direction of rotation as that of said driving shaft;

a first gear means connected at the end of said first worm shaft;

a second gear means fixed at the end of said second worm shaft;

wherein said first and second gear means are engaged respectively with said pinion gear of the driving shaft;

a fastening means for adjustably fixing said first worm shaft, at the end thereof, to said first gear means;

worm wheel means each engaging said worms of said first and second worm shafts;

pinion means each being integral with said worm wheel; and a ring gear means connected to the table of the machine tool and engaged with said pinion means, wherein said worm shafts consist of an outer first worm shaft and a second worm shaft fitted coaxially inside said first worm shaft, said second worm shaft being fixed to said first worm shaft through said fastening means and, simultaneously, said worms of said first and second worm shafts having helical pitch angle in reverse relation to each other.

2. A table turning apparatus claimed in claim 1, wherein said first and second worm shafts are arranged with said driving shaft interposed therebetween and parallel to said driving shaft.

3. A table turning apparatus in a machine tool for transmitting power from a driving source to a table, which comprises:

a driving shaft of said driving source having a pinion gear thereof;

said table of said machine tool performs positioning in continuous rotation;

a pair of first and second worm shafts, each having a worm, which are rotated in the same direction of rotation as that of said driving shaft;

a first gear means connected at the end of said first worm shaft;

a second gear means fixed at the end of said second worm shaft;

wherein said first and second gear means are engaged respectively with said pinion gear of the driving shaft;

a fastening means for adjustably fixing said first worm shaft, at the end thereof, to said first gear means;

worm wheel means each engaging said worms of said first and second worm shafts;

pinion means each being integral with said worm wheel; and a ring gear means connected to the table of the machine tool and engaged with said pinion means, wherein said fastening means consists of flexion couplings.

4. A table turning apparatus as claimed in claim 3, wherein said first and second worm shafts are arranged with said driving shaft interposed therebetween and parallel to said driving shaft.

\* \* \* \* \*